(12) United States Patent
Ali

(10) Patent No.: US 7,817,873 B2
(45) Date of Patent: Oct. 19, 2010

(54) ENHANCING CONTRAST OF VIDEO DATA WHILE PRESERVING SHARPNESS

(75) Inventor: Walid Ali, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 11/270,845

(22) Filed: Nov. 9, 2005

(65) Prior Publication Data

US 2007/0104388 A1      May 10, 2007

(51) Int. Cl.
    *G06K 9/40*   (2006.01)
(52) U.S. Cl. .............. 382/274; 348/E5.073; 348/E5.076
(58) Field of Classification Search ................. 382/274; 348/E5.073, E5.076
    See application file for complete search history.

(56) References Cited

U.S. PATENT DOCUMENTS

| 5,717,791 | A * | 2/1998 | Labaere et al. ............... 382/274 |
| 5,867,606 | A * | 2/1999 | Tretter .......................... 382/261 |
| 6,421,468 | B1 * | 7/2002 | Ratnakar et al. ............. 382/254 |
| 7,068,328 | B1 * | 6/2006 | Mino ............................ 348/672 |
| 7,110,046 | B2 * | 9/2006 | Lin et al. ..................... 348/679 |
| 7,181,086 | B2 * | 2/2007 | Gindele et al. .............. 382/265 |
| 2004/0258324 | A1 * | 12/2004 | Liang et al. ................. 382/274 |
| 2005/0047675 | A1 | 3/2005 | Walmsley et al. |
| 2005/0169553 | A1 | 8/2005 | Maurer |

OTHER PUBLICATIONS

Taiwan Patent Office, English Translation of Office Action issued in corresponding Taiwan Application No. 95141176, 15 pages, Nov. 10, 2009.

* cited by examiner

*Primary Examiner*—Bhavesh M Mehta
*Assistant Examiner*—Stephen R Koziol
(74) *Attorney, Agent, or Firm*—Trop, Pruner & Hu, P.C.

(57) ABSTRACT

A method of enhancing the contrast of image or video data may include applying a contrast increasing transfer function to a reference image to generate an enhanced image. A transformation may be applied to the reference image to generate reference high frequency components and may also be applied to the enhanced image to generate enhanced high frequency components. For a pixel in the reference image, whether a corresponding enhanced high frequency component has a higher energy than a corresponding reference high frequency component may be determined. The method may also include replacing the pixel in the reference image with a corresponding pixel in the reference image if the corresponding enhanced high frequency component has a higher energy than the corresponding reference high frequency component.

10 Claims, 4 Drawing Sheets

ENHANCING CONTRAST OF VIDEO DATA WHILE PRESERVING SHARPNESS

BACKGROUND

Implementations of the claimed invention generally may relate to schemes for enhancing image or video information and, more particularly, to schemes for enhancing the contrast of image or video information.

Pictures in video sequences may include three signals (e.g., red/green/blue (RGB) or luminance and chrominance (YUV) sampled in both the horizontal and vertical directions. For those images in the YUV color space, contrast may be conceptualized as a feature that indicates distribution of energy among different luminance (Y) values in an image. In general, contrast enhancement may increase the dynamic range of an image, while redistributing the energy in the image to the extremes (e.g., the highest and the lowest) of the luminance values.

The sharpness of an image may be a perceptual impression that is based on a concentration of relatively high energy in the high frequency components of an image. Some contrast enhancement may enhance the details in an image, also resulting in an increase in perceived sharpness.

Too much contrast enhancement, however, may result in the loss of fine details in an image, and a corresponding reduction in sharpness, because energy may be redistributed within luminance values of an image without balancing or tracking the effect of such redistribution on the high frequency components of the image.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
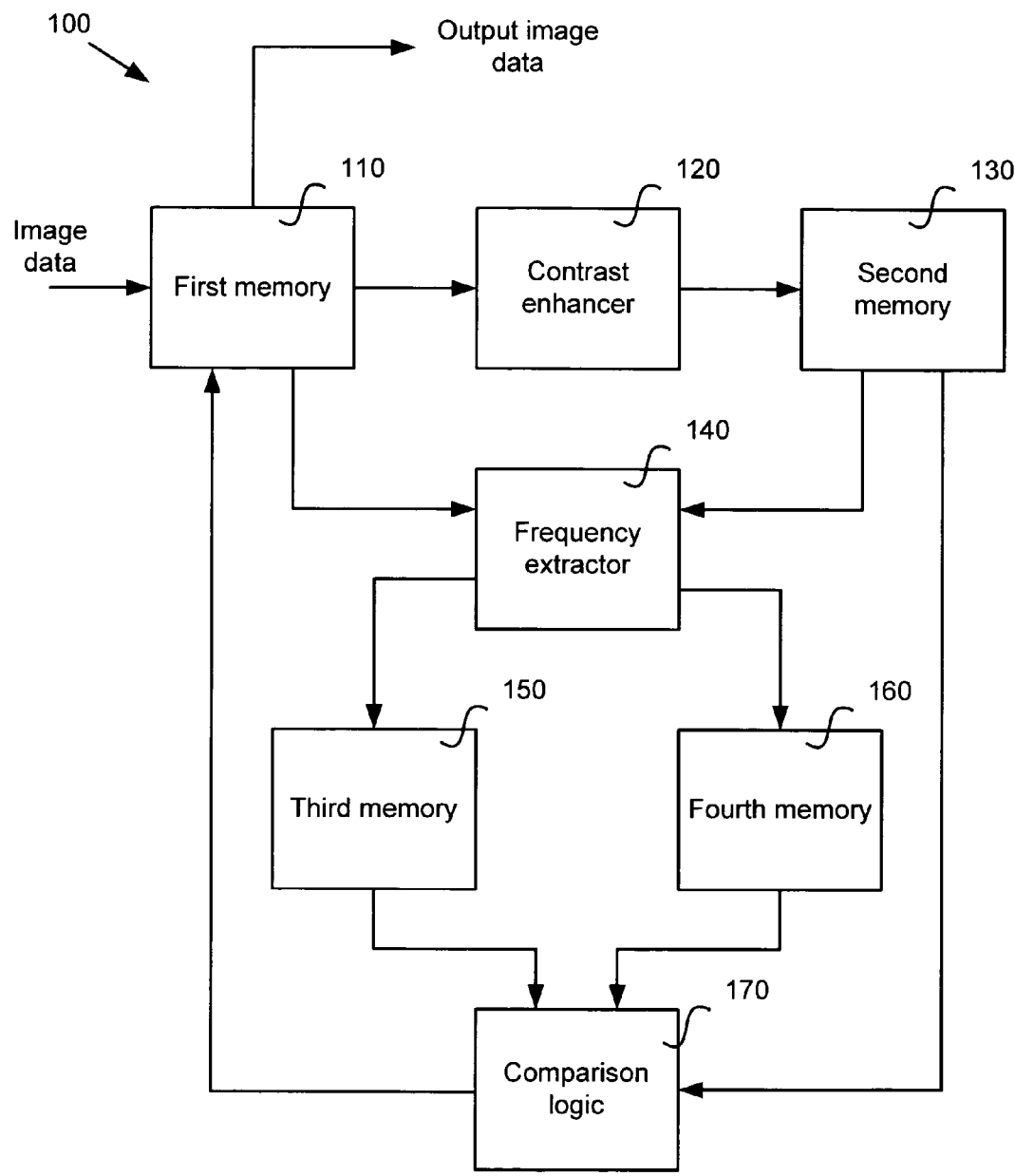
FIG. 1 illustrates an exemplary contrast enhancing system.

FIG. 1 illustrates an exemplary contrast enhancing system 100. System 100 may receive video information from any suitable medium, including but not limited to various transmission and/or storage media. Although illustrated as separate functional elements for ease of explanation, any or all of the elements of system 100 may be co-located and/or implemented by a common group of gates and/or transistors. Further, system 100 may be implemented via software, firmware, hardware, or any suitable combination thereof.

Contrast enhancing system 100 may include a first memory 110, a contrast enhancer 120, a second memory 130, a frequency extractor 140, a third memory 150, a fourth memory 160, and comparison logic 170. Although illustrated as discrete functional elements, certain ones of elements 110-170 may be commonly implemented. For example, in some implementations memories 110, 130, 150, and 160 may be implemented as portions of a single memory, with or without re-use. Also, in some implementations, one or more of contrast enhancer 120, frequency extractor 140, and/or comparison logic 170 may be implemented by a general-purpose or specific-purpose processor executing software and/or firmware. Other specific implementations for elements 110-170 are both possible and contemplated.

First memory 110 may be arranged to receive and store reference image data in a number of formats that may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), SMPTE's VC-1. In some implementations, first memory 110 may store the luminance (e.g., Y) values for an entire reference image. In some implementations, however, first memory 110 may store luminance values for some portion of a whole image, or for more than one image. In some implementations, first memory 110 may include a random access memory (RAM) so that individual pixels in the reference image in first memory 110 may be overwritten if desired.

Contrast enhancer 120 may be arranged to enhance the contrast of the reference image in first memory 110 and output an enhanced image having enhanced contrast to second memory 130. Contrast enhancer 120 may use any of a number of now-known or later-developed techniques to enhance the contrast of the reference image in first memory 110. In some implementations, by way of example, contrast enhancer 120 may determine image characteristics of the reference image (e.g., a luminance histogram of the reference image). Contrast enhancer 120 may then apply any contrast-enhancing transfer function (perhaps based on the reference image's characteristics, perhaps not) to the luminance values in the reference image to generate the enhanced image.

Figure 2:
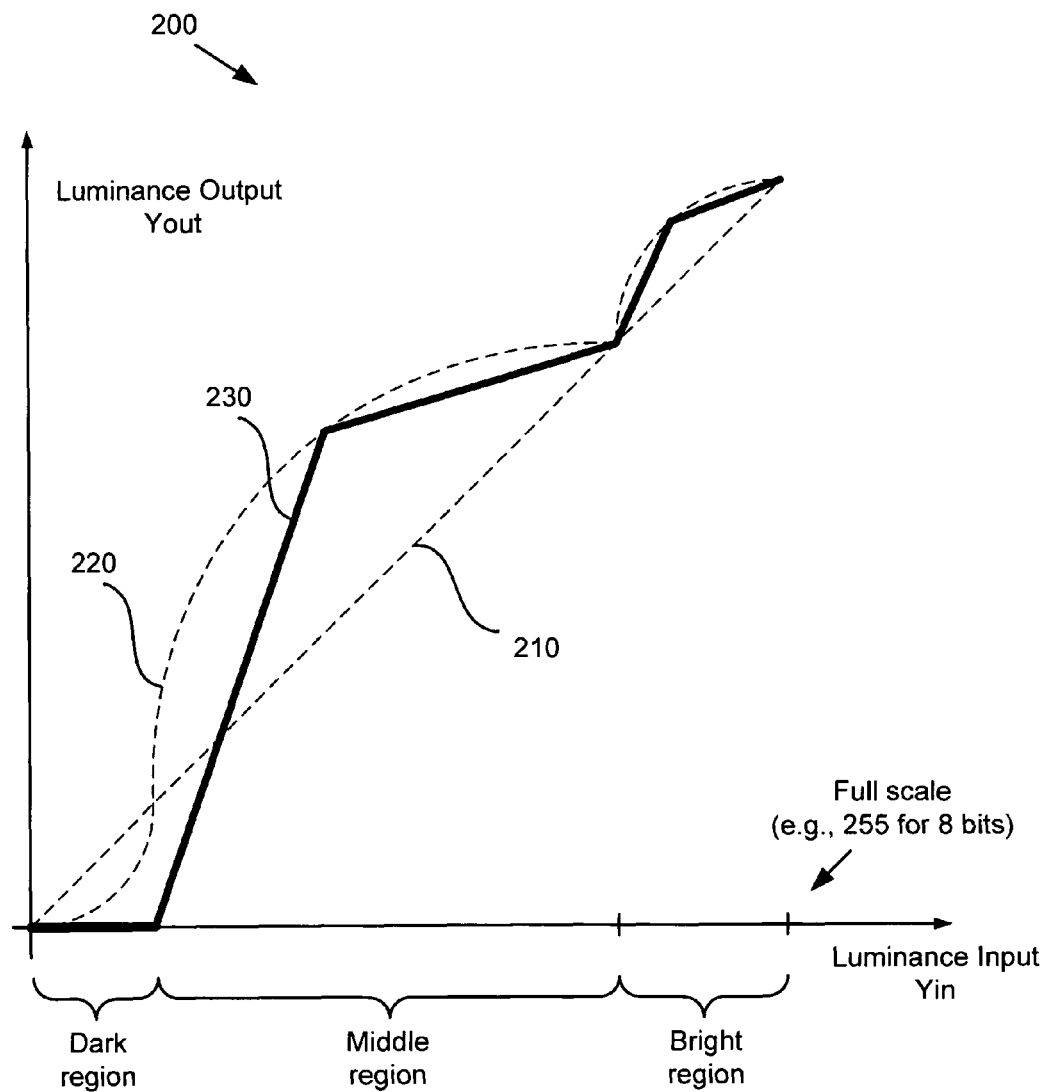
FIG. 2 illustrates an exemplary contrast enhancing transfer function.

FIG. 2 illustrates a plot 200 including one exemplary contrast enhancing transfer function 230 that may be used by contrast enhancer 120. For reference purposes, transfer function 230 is illustrated relative to a unity gain line 210 and a continuous contrast-enhancing transfer curve 220 that function 230 approximates. Of course, continuous curve 220 may be used in some implementations, but in other implementations a piecewise linear curve such as the four-point transfer function 230 may be easier to implement.

Turning to transfer function 230, it may behave differently for different luminance input values, such as those in the illustrated dark, middle, and bright regions. Boundaries between these regions may be set by contrast enhancer 120 based on the luminance characteristics of the reference image. For example, in some implementations the boundary between the "dark" and "middle" portions of function 230 may be set at 5% of full scale luminance to prevent coring in the output from noise, although other thresholds are both possible and contemplated. As another example, the boundary between the "middle" and "bright" portions of function 230 may be set at 75% of full scale luminance, although other thresholds are both possible and contemplated.

Within the middle region, function 230 may change slope at, for example, the median or mean luminance value of the reference image. Within the bright region, transfer function 230 may change slope at, for example, an average of the luminance values at the start of the bright region (e.g., 75% of full scale) and at the full scale (e.g., maximum available) value. For the specific example above, the knee or discontinuity of function 230 in the bright region may occur at about 87.5% of full scale. Within both the middle and bright regions, function 230 may have slopes for the different line segments slightly greater and/or slightly less than one. In some implementations, for example, the slopes of at least some segments of transfer function 230 may be $(1\pm\delta)$ for some relatively small value $\delta$.

In some implementations, contrast enhancer 120 may use transfer function 230 to enhance the contrast of the reference image in first memory 110 and to output the resultant, enhanced image to second memory 130. Contrast may be enhanced by "stretching" the luminance distribution of the image (e.g., making the bright pixels brighter and the dark pixels darker) via transfer function 230. It should be noted, however, that contrast enhancer 120 may apply any contrast-enhancing transfer function to the reference image to produce the enhanced image, and the claimed invention should not be limited to the specific, purely exemplary, transfer function 230 illustrated in FIG. 2.

Returning to FIG. 1, second memory 130 may be arranged to receive and store the enhanced image (e.g., luminance data) from image enhancer 120. The enhanced image in second memory 130 may correspond in size and other characteristics to the reference image in first memory 110 after operation by the transfer function of enhancer 120. In some implementations, second memory 130 may include a random access memory (RAM) or similarly addressable memory so that individual pixels in the enhanced image in second memory 130 may be read if desired.

Frequency extractor 140 may be arranged to extract at least some high frequency components from the reference image in first memory 110 and to store the resulting reference frequency components in third memory 150. Frequency extractor 140 also may be arranged to extract at least some high frequency components from the enhanced image in second memory 120 and to store the resulting enhanced frequency components in fourth memory 160. In some implementations, frequency extractor 140 may operate on the reference image and the enhanced image at substantially the same time. In some implementations, however, frequency extractor 140 may operate on the reference image first, for example while the enhanced image is being generated by contrast enhancer 120.

In some implementations, frequency extractor 140 may be arranged to perform a two-dimensional (2D) transformation on the reference image and the enhanced image. Various transformations that may be implemented by frequency extractor 140 to extract high frequency components may include, but are not limited to, Fourier transforms, discrete cosine transforms (DCTs), Hadamard transforms, wavelet transforms, and/or any one-dimensional or 2D transform capable of producing high frequency components from an image. In some implementations, frequency extractor 140 may perform a 2D discrete wavelet transformation (DWT) on the reference image to produce the reference frequency components in third memory 150 and on the enhanced image to produce the enhanced frequency components in fourth memory 160.

Figure 3A:
FIGS. 3A and 3B illustrate an exemplary image before and after frequency extraction.

FIG. 3A illustrates an exemplary image 310 before frequency extraction by frequency extractor 140. For explanatory purposes, image 310 may be either the reference image or the enhanced image, and may include, for example, luminance (Y) values.

Figure 3B:
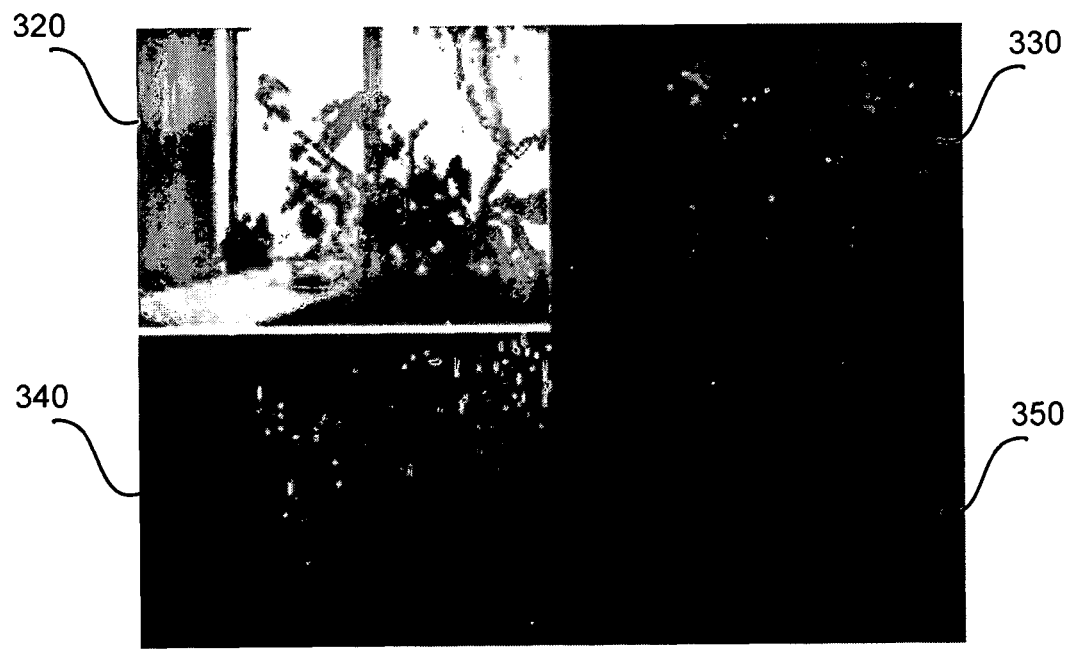

FIG. 3B illustrates exemplary components of image 310 after a 2D discrete wavelet transformation (DWT) by extractor 140. The 2D-DWT may decompose image 310 into a low-detail component 320 and three high-detail components (e.g., including high-frequency information) in a horizontal direction (i.e., horizontal component 330), in a vertical direction (i.e., vertical component 340), and in a diagonal direction (i.e., diagonal component 350). Those familiar with DWT may recognize that FIG. 3B illustrates a first-level decomposition, and that low-detail component 320 may be successively decomposed in second, third, etc. level decompositions. Although the claimed invention may be performed using components from a first-level wavelet decomposition, it should not be limited thereto, as it may also be performed with higher-level wavelet decompositions and/or other types of transformations to extract, for example, high-frequency components 330-350 or similar high-frequency information.

With reference to the exemplary components of FIG. 3B, frequency extractor 140 may store one set of components 320-350 (e.g., "reference components") that were generated from the reference image located in first memory 110 into third memory 150. Similarly, frequency extractor 140 also may store another set of components 320-350 (e.g., "enhanced components") that were generated from the enhanced image located in second memory 130 into fourth memory 160. In accordance with the properties of certain 2D transforms, the number of each of the horizontal, vertical, and diagonal components 320-350 may correspond (or be correlated in a known manner) to the number of pixels in the reference image or the enhanced image.

Returning to FIG. 1, third memory 150 may be arranged to receive and store the reference components (e.g., including high-frequency components of the reference image) from frequency extractor 140. In some implementations, third memory 150 may include a random access memory (RAM) or similarly addressable memory so that individual components (e.g., corresponding to pixels in the corresponding reference image) in third memory 150 may be read if desired.

Fourth memory 160 may be arranged to receive and store the enhanced components (e.g., including high-frequency components of the enhanced image) from frequency extractor 140. In some implementations, fourth memory 160 may include a random access memory (RAM) or similarly addressable memory so that individual components (e.g., corresponding to pixels in the corresponding enhanced image) in fourth memory 160 may be read if desired.

Comparison logic 170 may be arranged to selectively replace pixels of the reference image in first memory 10 with corresponding pixels of the enhanced image in third memory 130 based on a comparison of corresponding reference components and enhanced components in third and fourth memories 150 and 160. In general, comparison logic 170 may replace a reference pixel with an enhanced pixel when the energy of the high-frequency enhanced components is greater than the energy of the high-frequency reference components. If the energy of the enhanced components is not greater for a given pixel, comparison logic 170 may not replace the pixel in the reference image in first memory 110.

Comparison logic 170 may make an increasing or decreasing high-frequency energy determination for a given image pixel using one, some, or all of the reference components and enhanced components in memories 150 and 160. With reference to the specific example in FIG. 3B, comparison logic may use one, some, or all of horizontal component 330, vertical component 340, and diagonal component 350 for the comparison. For example, comparison logic 170 may compute the following sum:

horizontal factor*(horizontal$_{enh}$–horizontal$_{ref}$)+vertical factor*(vertical$_{enh}$–vertical$_{ref}$) +diagonal factor*(diagonal$_{enh}$–diagonal$_{ref}$), where "enh" and "ref" denote high-frequency enhanced and reference components, and where the various factors indicate weighting or scale factors used to differently weight one component (e.g., horizontal) more than, less than, or then same as others. Comparison logic 170 may then be compare this weighted sum with zero to identify an absolute energy increase, or with some non-zero number to identify an energy increase larger than a certain amount.

In some implementations, comparison logic 170 may compare only one or two of the frequency components (e.g., 330-350), with or without a weighting factor. For example, comparison logic may compare just the horizontal components 330, just the vertical components 340, just the diagonal components 350, or some combination thereof. Comparison logic 170 also may cause first memory 110 to output the reference image after a terminal condition is met. Examples of terminal conditions may include a fixed number (e.g., one, two, three, four, etc.) of per-pixel traversals through the reference image (including successive contrast enhancements by contrast enhancer 120), or until the energy in the high-frequency components of the enhanced image starts to decrease.

Figure 4:
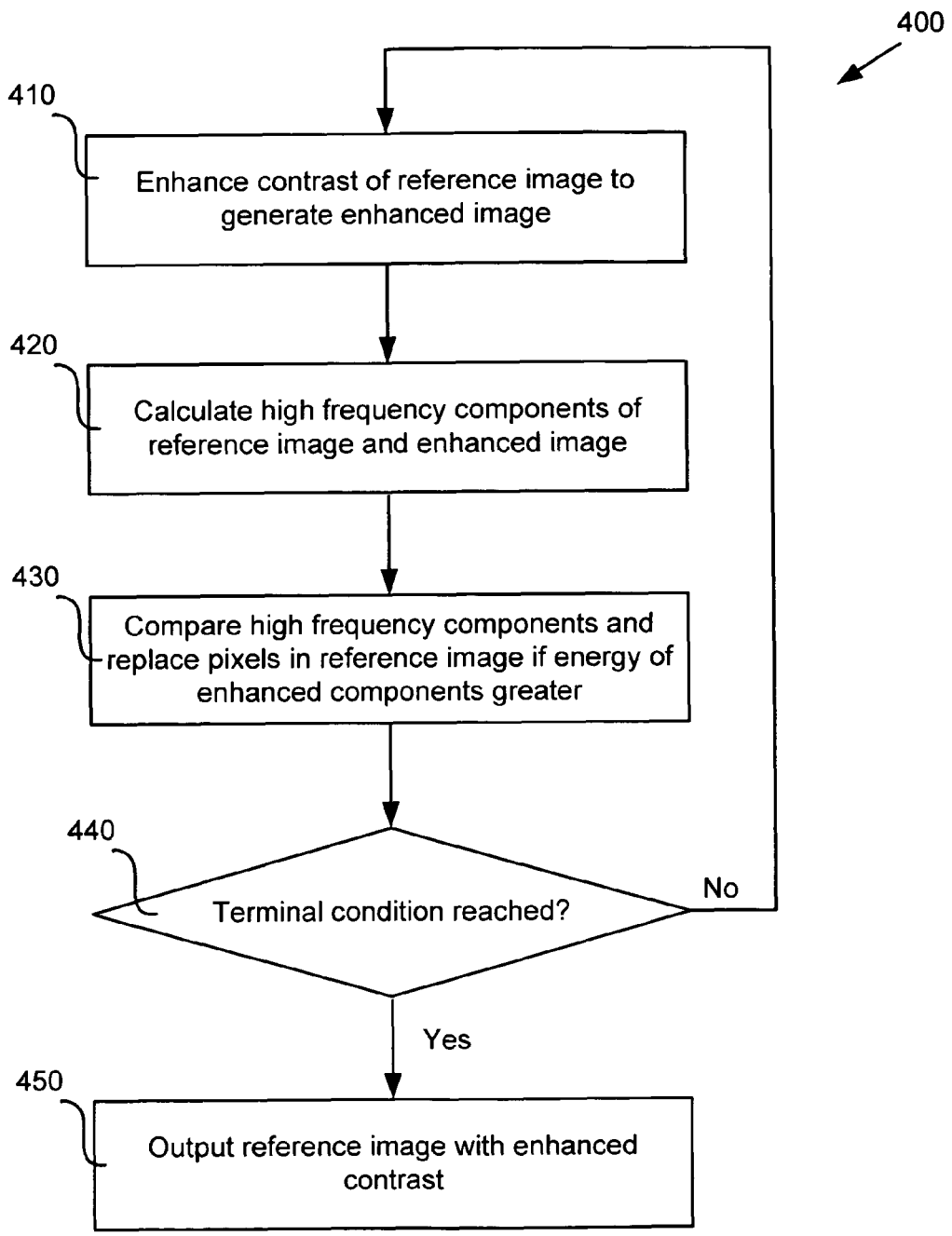
FIG. 4 illustrates an exemplary process of enhancing the contrast of an image.

FIG. 4 illustrates an example process 400 of an exemplary process of enhancing the contrast of a reference image. Although FIG. 4 may be described with regard to contrast enhancing system 100 in FIG. 1 for ease and clarity of explanation, it should be understood that process 400 may be performed by other hardware and/or software implementations.

Processing may begin by enhancing the contrast of a reference image by contrast enhancer 120 to generate an enhanced image [act 410]. Any contrast enhancing transfer function may be used to generate the enhanced image, such as function 230 in FIG. 2. In some implementations, act 410 may be performed on an image that includes luminance values. In conjunction with act 410, the reference image and the enhanced image may be stored in memories 110 and 130.

Processing may continue by frequency extractor 140 calculating high frequency components of the reference image and of the enhanced image to produce reference components and enhanced components, respectively [act 420]. Although any 1D or 2D transform may be used to calculate high frequency components, in some implementations, a first level, 2D DWT may be used to determine horizontal, vertical and/or diagonal high-frequency components of the reference image and of the enhanced image. In conjunction with act 420, these reference components and the enhanced components may be stored in memories 150 and 160.

Comparison logic 170 may perform a per-pixel comparison of the reference and enhanced high-frequency components, and may also replace pixels in reference image with corresponding pixels from the enhanced image if the energy of the enhanced high-frequency components is sufficiently greater [act 430]. Any combination of horizontal, vertical and/or diagonal high-frequency components from the enhanced image and from the reference image may be compared, with or without weighting or scale factors to weight one or more components differently from the others.

Only if comparison logic 170 determines that the energy of the high-frequency components of the enhanced image is greater (either in the absolute sense or by a predetermined margin) than those of the reference image in act 430, comparison logic 170 may replace the pixel in question in the reference image with a corresponding pixel from the enhanced image. Comparison logic 170 may perform such compare-and-selectively-replace operations for all pixels within reference image in first memory 110.

If, after performing act 430 for the all pixels (or alternately a subsampled set of pixels) in the reference image, a terminal condition has not been reached [act 440], the modified reference image (having had some of its pixels replaced) may be enhanced again in act 410, and acts 420 and 430 may be repeated. Several terminal conditions are both possible and contemplated. In some implementations, acts 410-430 may be repeated until there are no pixels in the enhanced image with a greater high frequency energy content than those in the reference image. In some implementations, the terminal condition may be a sufficiently small number of pixel replacements (e.g., 5, 10, 50, 100, etc.) within the reference image. That is, acts 410-430 may iterate until less than a predetermined number of pixels are replaced in act 430.

In some implementations, the terminal condition may be a predetermined number of reference image traversals (e.g., after act 430 is performed one, two, five, ten, etc. times). Other variations are possible, however, such as the earlier-occurring of a predetermined number of iterations through the reference image and subsequent generation of enhanced images (e.g., 5 iterations) and a predetermined number pixel replacements (e.g., 50 or less pixel replacements) within the reference image.

When comparison logic 170 determines that the terminal condition has been reached [act 440], it may direct first memory 110 to output reference the reference image [act 450]. After selective pixel replacement, the reference image may have enhanced contrast, while retaining high-frequency energy (e.g., perceived sharpness). Hence, by looking at the frequency components of the reference image before and after contrast enhancement, the contrast enhancement may be restrained from removing fine details in the image. Such frequency analysis may avoid loss of fine details in the image (or in video of which the image is a part) while improving the contrast of the image.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although the above-described scheme includes per-pixel comparison and selective replacement, such comparison/replacement based on higher frequency content may, in some implementations, be performed for alternating pixels, groups of pixels, etc. within an image. The scheme described herein and claimed may encompass any contrast-enhancing technique that uses any type of frequency analysis to avoid loss of fine detail while enhancing contrast. Further, as used herein "high-frequency" may include any frequencies, or range of frequencies, that correspond to "fine" spatial details (e.g., thin features, small features, transitions, textures, etc.) in the overall context of the image in question.

Further, the acts in FIG. 4 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method, comprising:
   creating a first contrast enhanced depiction from a reference depiction;
   selectively replacing elements of said reference depiction with elements of said enhanced depiction to form a second contrast enhanced depiction; and
   displaying a depiction based on said second contrast enhanced depiction using a processor.

2. The method of claim 1, further comprising:
   storing the reference depiction and first contrast enhanced depiction in a memory.

3. The method of claim 1, further comprising:
   applying a transform to the reference depiction to generate the elements of said first contrast enhanced depiction; and
   applying the transform to the first contrast enhanced image to generate the at least one frequency component of the second contrast enhanced image.

4. The method of claim 3, wherein the transform is a two dimensional wavelet transform.

5. The method of claim 1, including comparing at least one frequency component of the reference depiction with at least one frequency component of the first contrast enhanced depiction wherein the comparing includes:
   determining whether the at least one frequency component of the first contrast enhanced depiction has a greater energy than the at least one frequency component of the reference depiction.

6. A system, comprising:
   a contrast enhancer to apply a contrast enhancing transfer function to a first image to generate a first contrast enhanced image;
   a memory;
   a frequency extractor to extract first frequency components from the first image and second frequency components from the first contrast enhanced image and to store said components in said memory; and
   comparison logic to access said components from memory and compare the first frequency components and the second frequency components and to selectively replace pixels in the first image with pixels from the first contrast enhanced image based on results of the comparison to form a second contrast enhanced image.

7. The system of claim 6, further comprising:
   a first memory coupled to the contrast enhancer to store the first image; and
   a second memory coupled to the contrast enhancer to store the first contrast enhanced image.

8. The system of claim 6, further comprising:
   a third memory coupled to the frequency extractor to store the first frequency components; and
   a fourth memory coupled to the frequency extractor to store the second frequency components.

9. The system of claim 6, wherein the frequency extractor is arranged to perform a Fourier transform, a cosine transform, or a wavelet transform on the first image and the first contrast enhanced image.

10. The system of claim 6, wherein the comparison logic is arranged to determine whether a combination of the second frequency components is greater than a combination of the first frequency components.

* * * * *